United States Patent [19]

Perry et al.

[11] Patent Number: 4,516,237

[45] Date of Patent: May 7, 1985

[54] REMOTE DATA LINK CONTROLLER HAVING MULTIPLE DATA LINK HANDLING CAPABILITIES

[75] Inventors: Thomas J. Perry, Phoenix; Muhammad I. Khera, Glendale, both of Ariz.

[73] Assignee: GTE Automatic Electric Inc., Northlake, Ill.

[21] Appl. No.: 564,138

[22] Filed: Dec. 22, 1983

[51] Int. Cl.³ .............................................. H04Q 11/04
[52] U.S. Cl. ......................................... 370/58; 370/63; 370/99
[58] Field of Search ................. 370/58, 63, 99; 178/3; 179/18 ES

[56] References Cited

U.S. PATENT DOCUMENTS

| | | | |
|---|---|---|---|
| 4,201,893 | 5/1980 | McLaughlin | 370/58 |
| 4,210,782 | 7/1980 | Fujita | 179/18 ES |
| 4,280,217 | 7/1981 | Hafer et al. | 179/18 ES |
| 4,327,436 | 4/1982 | Ohara et al. | 370/58 |
| 4,413,335 | 11/1983 | Clements et al. | 370/63 |
| 4,484,323 | 11/1984 | Beuscher et al. | 370/58 |

OTHER PUBLICATIONS

"GTD-5 EAX-Digital Remote Units", by S. E. Pucci et al., NTG-Fachber, (Germany), vol. 73, 1980.
"GTD-5 EAX-A Family of Digital Switches", by M. H. Esperseth et al., International Switching Symposium, Paris, May 7-11, 1979.
"Adaptation of the GTD-5 EAX for International Applications", by S. Cznarnecki et al., GTE Automatic Electric Journal, Sep.-Oct., 1981.

Primary Examiner—Douglas W. Olms
Assistant Examiner—Kenneth I. Rokoff
Attorney, Agent, or Firm—Anthony Miologos; Peter Xiarhos

[57] ABSTRACT

A remote data link controller is disclosed for formatting, transmitting and receiving control data over high speed digital data links between the peripheral processors of a plurality of telecommunications switching systems. The remote data link controller includes a microprocessor controlled data link processing circuit which is time shared among all of the digital data links. The remote data link controller processes one transmit and one receive message byte during a reformatting cycle for each digital data link. It stores any intermediate results in a temporary memory than proceeds to service the next digital data link. The remote data link controller fetches intermediate results from the temporary memory, processes the data and stores the next intermediate results in the temporary memory until it has completely serviced all of the digital data links.

8 Claims, 6 Drawing Figures

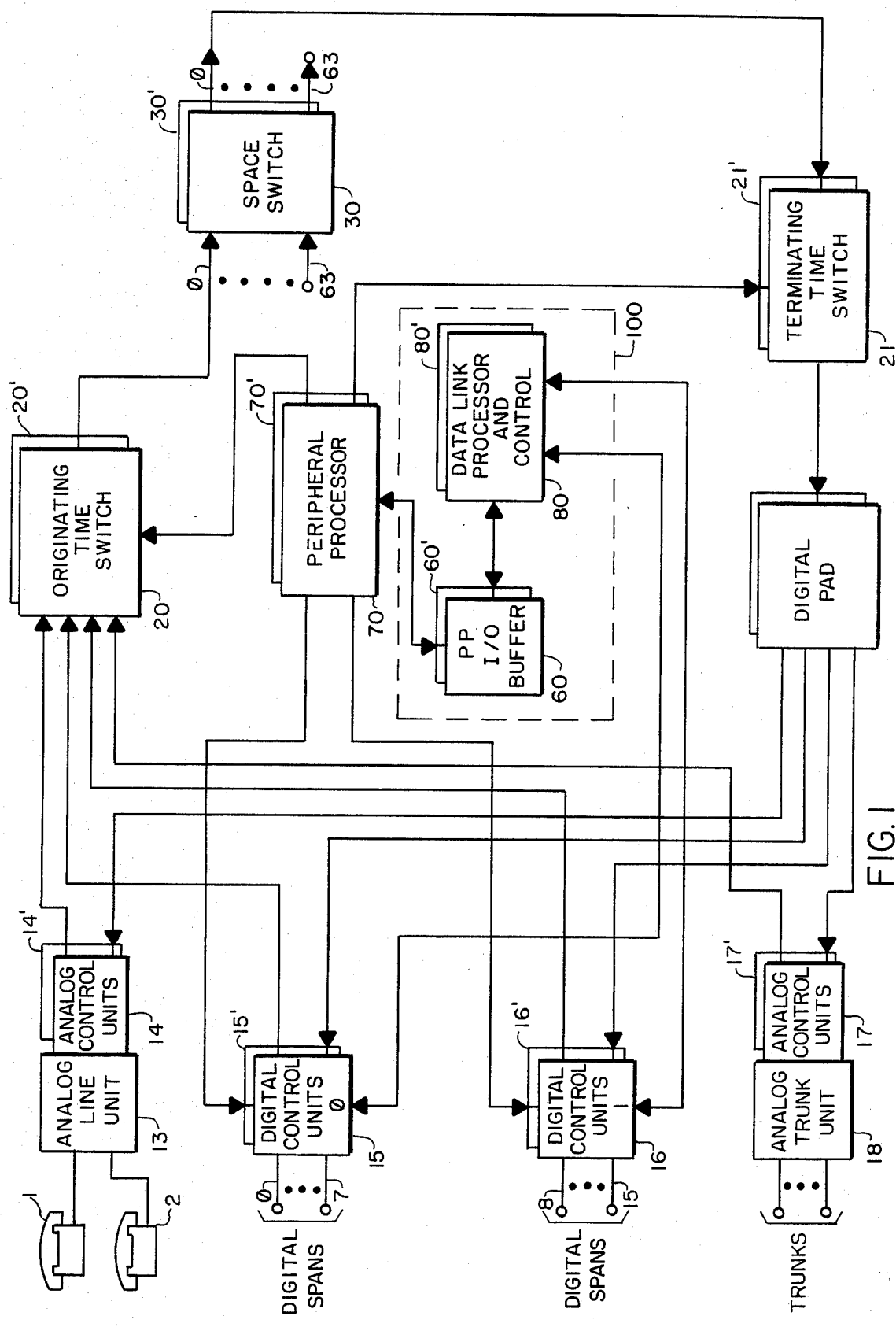
FIG. I

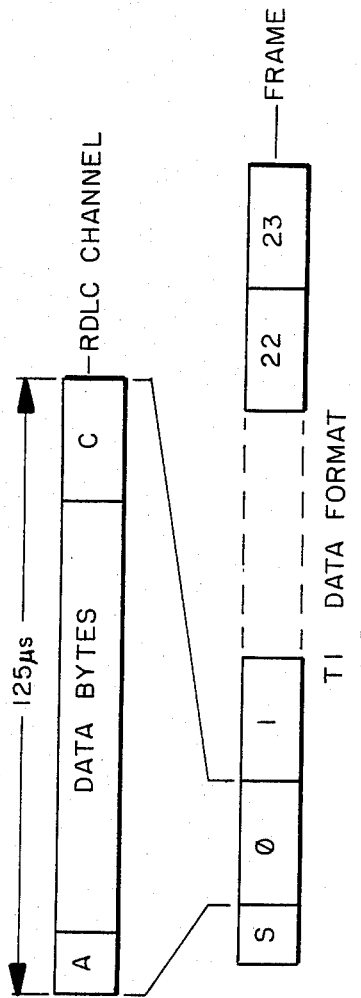

REMOTE DATA LINK CONTROLLER HAVING MULTIPLE DATA LINK HANDLING CAPABILITIES

CROSS-REFERENCE TO RELATED APPLICATIONS

The present application is related to the following co-pending U.S. patent applications all having the same inventive entity and being assigned to the same assignee:

Ser. No. 564,134, titled, "A Remote Data Link Controller;"

Ser. No. 564,135, titled, "A Remote Data Link Receive Data Reformatter;"

Ser. No. 564,133, titled, "A Remote Data Link Transmit Data Formatter;"

Ser. No. 564,136, titled, "A Remote Data Link Address Sequencer and Memory Arrangement for Accessing and Storing Digital Data;"

Ser. No. 564,137, titled, "A Data Format Arrangement for Communication Between the Peripheral Processors of a Telecommunications Switching Network."

BACKGROUND OF THE INVENTION

The present invention relates in general to data transmission between the switching systems of a telecommunication network and more particularly to a remote data link controller for formatting, transmitting and receiving control data between the peripheral processors of a plurality of switching systems.

In modern digital telecommunication switching systems a concept of network modularity has been designed allowing the interconnection of small switching systems remote to a larger host system. These remote switching systems have capacities to handle between a few hundred and a few thousand telephone subscribers. The remote switching systems are normally used in areas where the installation of a large switching system would be uneconomical.

A high speed digital data link typically interfaces the host switching system to the remote system through which large amounts of voice and control data are exchanged. The voice data normally comprises subscriber calls switched through either the host or the remote system. The control data may be status exchanges between the host and the remote, i.e. centralized administration, billing and maintenance, or the direct control of the operation of the remote by the host.

The control data exchanges are originated in the sending system peripheral processor transmitted over the high speed digital data link to the receiving system peripheral processor where the data is interpreted. In order to relieve each peripheral processor from the burden of controlling the data link a remote data link controller is implemented in each system which performs all tasks involved in the formatting, transmission and reception of the control data.

The remote data link controllers are connected to each other via digital spans. These digital spans may be T1, T2 or T1C, T3 carriers using DS1, DS2 or DS1C, DS3 data formats, respectively. These digital spans transmit data at high speeds serially at a rate of approximately 1.5–45 megabits per second.

One method presently used in the industry for controlling a data link is the serial data link controller (SDLC) protocol developed by IBM INCORPORATED. The SDLC protocol requires the SDLC circuitry to handle one link on a dedicated basis. That is, in a system where the host connects to for instance, 16 remote units, a single SDLC circuit would be required for each link. Because of the complexity of the SDLC circuitry it is impractical to control all 16 data links with a single SDLC circuit.

Accordingly, it is the object of the present invention to provide a single remote data link controller which can be shared among a plurality of data links for formatting, transmitting and receiving control data between the peripheral processors of a host and a plurality of remote switching systems.

SUMMARY OF THE INVENTION

In accomplishing the object of the present invention there is provided a telecommunications switching system including a peripheral processor and a plurality of digital data links for sending data messages in the form of message bytes to a plurality of remotely located telecommunications switching systems. The remote data link controller of the present invention is used to process control data in each telecommunications switching system using one controller to handle the servicing of all of the digital data links.

The remote data link controller is comprised of a peripheral processor output buffer connected to the peripheral processor. The peripheral processor output buffer includes a plurality of transmit buffers with each transmit buffer associated with one of the digital data links. Each transmit buffer is arranged to store a plurality of control data normally in the form of data words from the peripheral processor.

The peripheral processor output buffer is connected to a formatter circuit which is arranged to process sequentially one data word from each of the transmit buffers assembling each data word into a message byte. The formatting circuit is further connected to a temporary memory which includes a plurality of memory location areas. Each memory location area is associated with one of the digital data links. After one message byte has been formatted by the formatting circuit the message byte is transferred to a specific memory location in the temporary memory associated with the digital data link being serviced at the time. The formatter may also contain a partially completed message byte which is also output to the memory location area associated with that particular digital data link.

A counter circuit connected to the temporary memory is arranged to count the number of message bytes assembled for each of the digital data links and the number of data bits contained in a partially completed message byte. After one message byte has been formatted, the counter outputs its counting of data to the temporary memory location area associated with the digital data link.

Finally, a plurality of data link output buffers are connected to the temporary memory with each of the data buffers connected to a plurality of digital data links. Each data link output buffer is arranged to receive from the temporary memory in sequential order, starting with the first digital data link and ending with the last digital data link, a message byte to be transmitted to an associated remotely located telecommunications switching system.

In receiving data from the remotely located telecommunications switching systems, the remote data link controller operates substantially in the same manner as described previously. A plurality of data link input buffers are each connected to a plurality of digital data links. Each data link input buffer is arranged to receive from its respective digital data links a message byte of a data message transmitted from an associated and respective remotely located telecommunications switching system. The data link input buffers are connected to a temporary memory and its plurality of memory location areas. The temporary memory is arranged to receive and store in each memory location area a message byte received over an associated digital data link.

A reformatting circuit connected to the temporary memory processes sequentially the message bytes from each of the memory location areas. One data word is reformatted for each digital data link. It should be noted, that in the reformatting process as was the case in the formatting process, a partial data word may be assembled which is output to the temporary memory for storage. The partially reformatted data word is later re-input to the reformatter circuit where new bits from a newly arrived message byte are added to form a new data word. Each memory location area in the temporary memory also receives from the counter circuit a count of the number of data words assembled for each digital data link as well as a count of the number of data bits contained in a partially assembled data word.

Finally, a peripheral processor input buffer is connected to the reformatting circuit. The peripheral processor input buffer includes a plurality of receive buffers with each receive buffer associated with one of the digital data links. Each receive buffer is arranged to receive and store a plurality of reformatted data words allowing the peripheral processor to access the data words and read the control data.

DESCRIPTION OF THE DRAWINGS

FIG. 1 is a block diagram of a telecommunications switching system including the remote data link controller of the present invention.

FIG. 2 is a bit map of a channel and frame of a T1 data span.

FIG. 3 is a bit map representation of the message format developed by the remote data link controller.

DESCRIPTION OF THE PREFERRED EMBODIMENT

Figure 4:
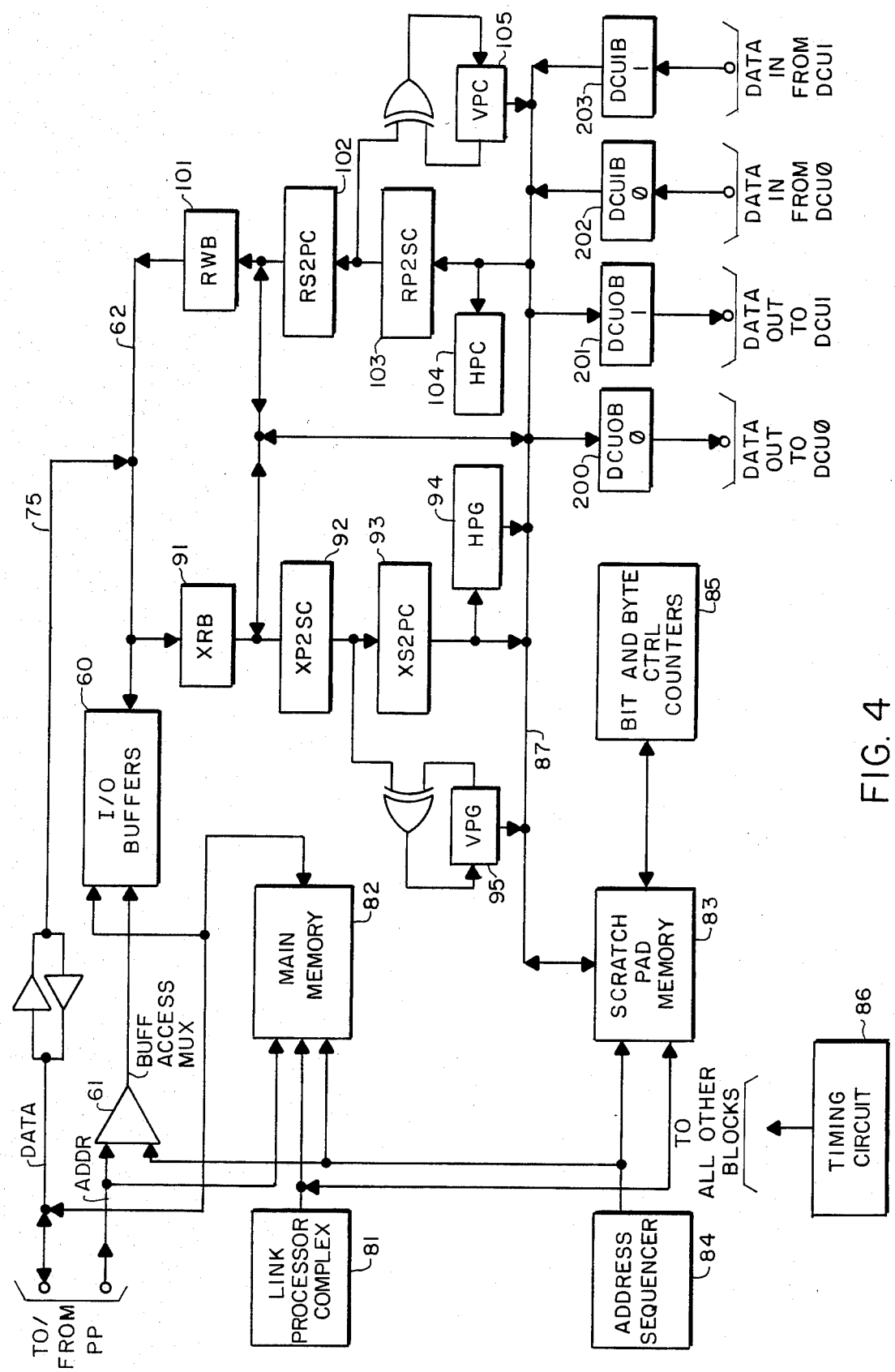
FIG. 4 is a detailed block diagram of the remote data link controller of the present invention.

Referring to FIG. 1, a time-space-time digital switching system along with the corresponding common control is shown. Telephone subscribers, such as subscribers 1 and 2, are shown connected to analog line unit 13. Analog line unit 13 is connected to both copies of the analog control unit 14 and 14'. Originating time switches 20 and 20' are connected to a duplex pair of space switch units 30 and 30' which are in turn connected to a duplex pair of terminating time switches 21 and 21'. Terminating time switches 21 and 21' are connected to analog control units 14 and 14' and ultimately to the telephone subscribers 1 and 2 via analog line circuit 13. Digital control units 15, 15' and 16, 16' connect the digital spans to the switching system. Digital span equipment may be implemented using a model 9004 T1 digital span, manufactured by GTE Lenkurt, Inc. Similarly, analog trunk unit 18 connects trunk circuits to the digital switching system via analog control units 17 and 17'.

A peripheral processor CPU 70 controls the digital switching system and digital and analog control units. Analog time unit 13 and a duplex pair of analog control units 14 and 14' interface to telephone subscribers directly. A duplicate pair of digital control units 15, 15' and 16, 16' control the incoming PCM data from the digital spans. Similarly, the analog trunk unit 18 and a duplex pair of analog control units 17 and 17' interface to trunk circuits. The analog and digital control units are each duplicated for reliability purposes.

The network of FIG. 1 also includes a REMOTE DATA LINK CONTROLLER (RDLC) 100 which provides formatting and control of data transmitted and received between the peripheral processors of two or more switching systems. The RDLC can provide up to 16, 64 kilobits per second data links arranged for full duplex operation and is configured so that it can provide one full duplex data link for each of the 16 T1 spans. RDLC 100 can operate together with one or two digital control units (DCU), with each DCU capable of providing up to eight T1 carrier facilities.

RDLC 100 includes a duplicated data link processor and control 80 and 80' and a duplicated peripheral processor (PP) I/O buffer 60 and 60'.

Prior to examining the detailed operation of the RDLC 100, it is helpful to understand the format and protocol of the messages which are transmitted and received by the RDLC. Each message consists of eight, 8-bit bytes of data for a total of 64 bits. The peripheral processor I/O buffer provides four transmit message buffers and four receive message buffers for each of the 16 possible data links.

Normally, peripheral processor software writes a message into a transmit message buffer of PP I/O buffer 60 and 60' associated with a data link and then issues a transmit command to data link processor and control 80 and 80'. The data link processor and control 80 and 80' responds by taking the message out of the transmit message buffer, formatting the data so that it can be transmitted over a T1 carrier and then transmits the message to the distant end of the data link through the appropriate DCU and digital span.

When a message is received, the data link processor and control 80 and 80' reformats the received data and places the message into an appropriate receive message buffer in the PP I/O buffer 60 and 60'. Data link processor and control 80 and 80' then causes an interrupt, alerting peripheral processor 70 and 70' to the fact that a message has been received. The RDLC will queue up to three received messages for each data link. It should be noted that under normal conditions the RDLC functions in a duplex configuration, that is, it matches all outgoing signals performed in the DCUs. With this arrangement there is one RDLC circuit for each of the two copies of the DCUs.

The nature of a T1 data and its format is shown in FIG. 2. Normally, each T1 span transmits and receives voice samples organized together into a frame. Each frame includes 24 voice samples with each voice sample associated with one channel of voice (or data). The channels are numbered 0–23. Normally, the RDLC will insert its data bytes in channel 0. The S bit carries a periodic pattern which, when detected, is used to identify the beginning of each frame of data.

Turning to FIG. 3, the complete data format for one message is shown. The data format is byte oriented with one 8-bit byte being transmitted during each T1 data frame for each data link. When the link is idle and not transmitting the transmitter sends idle patterns consisting of all ones. The beginning of a message is indicated by sending a control byte containing one or more zeros which may contain information conveying the sequence number of messages transmitted or received and/or acknowledgements between the RDLCs. As can be seen in FIG. 3 only six control bits are used (XC, XB, XA, RC, RB, RA) in the control byte. The first data bit to be transmitted is inserted in the bit 1 position of the control byte. The control byte further includes an odd parity bit in bit position 0. The next nine bytes contain the remaining 63 bits of data, each byte containing seven bits of data plus an odd parity bit. The final message byte contains seven vertical parity bits plus an odd parity bit for the vertical parity byte. Each vertical parity bit provides even parity for ten of the preceding bits, i.e. P1 for bit 1 in each of the preceding ten bytes, P2 for bit 2, P3 for bit 3, etc. The next byte will contain idle pattern.

It should be noted that the idle pattern is unique in that it has even parity. This makes it easy for the receiver to synchronize with the incoming data stream and greatly reduces the chance that a receiver would accept an incorrect message because of improper synchronization.

Turning now to FIG. 4, a block diagram of the Data Link Processor and control 80, 80' of RDLC 100 is shown. The link processor complex 81 includes an Intel 8085A microprocessor together with associated read only memory (ROM), address and data latches and timing and control circuitry. The processor under control of the program in ROM simply controls the operation of the RDLC. Main memory 82 is a 256×8 bipolar random access memory (RAM) arranged for shared access by the link processor complex 81, the peripheral processor (PP) and the address sequencer 84. The link processor complex 81 uses main memory 82 as its primary read/write memory. The PP uses it for a status and control function.

Both the PP and the address sequencer 84 do a prefetch of a 2-bit page address from the main memory 82 prior to accessing the I/O buffers 60. This page address is used to identify which of the four buffers associated with a single data link will actually be accessed during the I/O buffer access.

Buffer access multiplexers 61 are a set of multiplexers and tri-state drivers which allow the RDLC hardware to share access to the I/O buffers 60 with software access from the PP. The I/O buffers 60 are a 1K random access memory (RAM) containing the four transmit and the four receive message buffers for each of the 16 data links.

Intermediate data is stored in scratch pad memory 83 with which is addressed by counters in address sequencer 84. Address sequencer 84 also provides control hardware sequencing to the rest of the RDLC. Bit and byte control counters 85 determine which bit of which byte is actually being processed at any given instant by the transmit formatter and receive reformatter.

The transmit formatter comprises elements 91 through 95 and is the circuitry that takes the 8-bit bytes from the I/O buffer 60 transmit buffers and converts them to the 7-bit plus parity format that is transmitted. The receive reformatter elements 101 through 105 is the circuitry that takes the incoming data and converts it back into the 8-bit bytes placed into the receive buffers of I/O buffer 60.

The timing circuit 86 is a read only memory driven, finite state machine arranged to generate periodic signals used for timing and synchronization within the RDLC.

Figure 5:
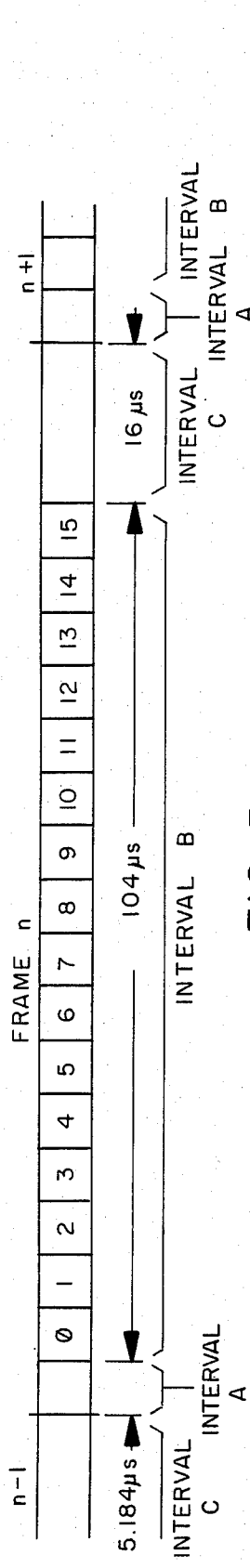
FIG. 5 is a detailed time utilization diagram of the bit map of a data byte and a remote data link channel represented in FIG. 2.

Turning now to FIG. 5, the overall timing that repeats for every frame is shown. As can be seen the frame is divided into three intervals. Interval A, interval B and interval C. During interval A, the RDLC devotes all resources to the task of transferring data to and from the DCUs. Data for all 16 data links is exchanged during this 5.184 microsecond interval. No processing of data occurs during this time, however the peripheral processor may access the I/O buffer 60 or the main memory 82 for status information. During interval B, the RDLC devotes its time to processing data; handling link 0, then link 1 and so on for all 16 links. Within each frame, each link handles one transmit and one receive data byte. The RDLC takes 6.48 microseconds to process both transmit and receive data for one link, requiring about 104 microseconds for all 16 links. During interval C, the RDLC reformatters do nothing except wait for the beginning of the next frame. This waiting period lasts approximately 16 microseconds. Therefore, the entire RDLC channel within each frame lasts approximately 125 microseconds.

Figure 6:
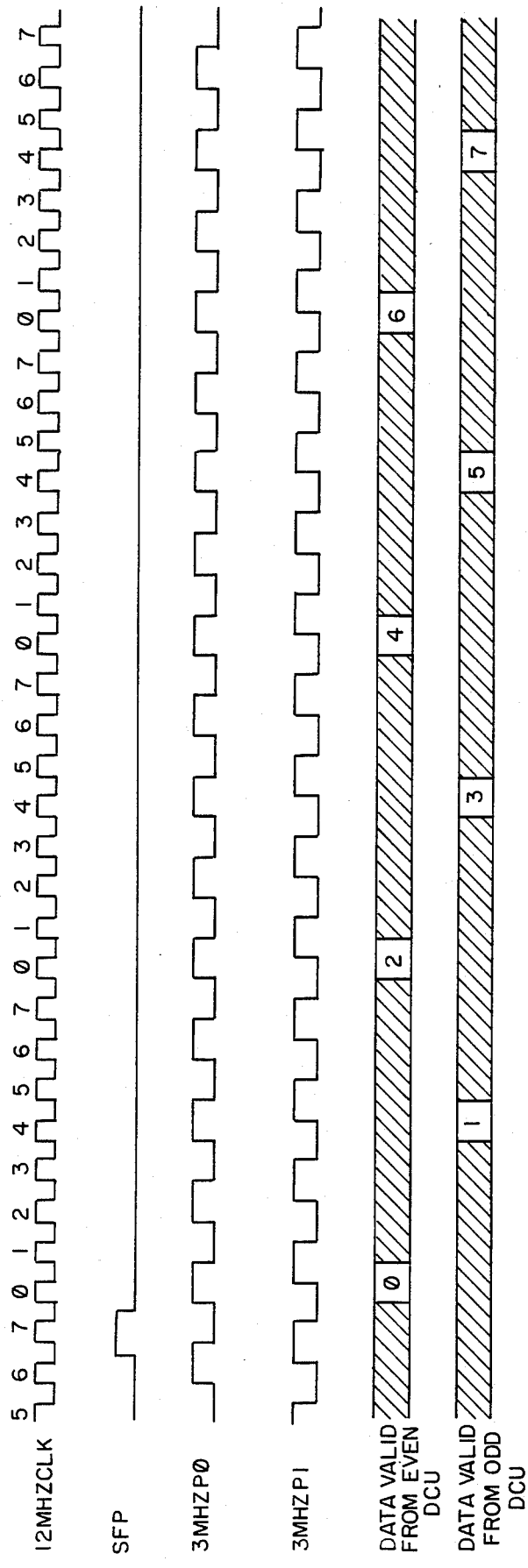
FIG. 6 is a remote data link controller transfer timing diagram.

Turning to FIG. 6 and FIG. 4, a closer look at the timing during interval A is shown. During interval D, data is valid from the even DCU and is transferred to the even DCU input buffer (DCUIB) 202. Simultaneously, a read access to the scratch pad memory 83 extracts the next output byte which is transferred to the even DCU output buffer (DCUOB) 200. During inverval E, a received input byte from the even DCU input buffer DCUIB 202 is transferred to the scratch pad memory 83 for the appropriate data link. Simultaneously, the odd DCU will extract data from a DCU output buffer DCUOB 200 in preparation for transmitting it. During interval F, a transmitter output byte is transferred from the scratch pad memory 83 to the odd DCU output buffer DCUOB 200. Simultaneously, data is transferred from the odd DCU into the associated odd DCU input buffer DCUIB 203. During interval G, the even DCU takes data from its associated DCU output buffer DCUOB 200 in preparation for transmitting it. Simultaneously, a receive input byte from the odd DCU input buffer DCUIB 203 is transferred into the scratch pad memory 83.

Much of the activity on the RDLC takes place during the reformatting interval (Interval B). This interval is divided into 16 reformatting cycles. During each reformatting cycle, one byte of transmit data and one byte of received data is reformatted for one data link. During the 16 cycles data for each of the 16 data links is processed one data link per cycle. Therefore, the RDLC processes one transmit and one receive message byte per reformatting cycle for one data link. It stores any intermediate results in the scratch pad memory 83 and then proceeds to serve the next data link. Fetching intermediate results from the scratch pad memory, processing the data, and storing the next intermediate results and so on until the RDLC has served all 16 data links. The scratch pad memory 83 therefore provides storage for the transient state information (intermediate results) that is necessary to keep track of what each of the individual data links is doing. This information is updated once every frame or 125 microseconds.

With renewed reference to FIG. 4, a detailed explanation will be given for the transmit and receive reformatters. Transmit data from the PP is processed in the following manner. A message byte from the PP is loaded into the I/O buffer 60 and eventually transferred into the transmit read buffer (XRB) 91 via the I/O buffer bus 62 where it is available for further processing. The XRB provides an asynchronous interface between I/O buffer 60 and the transmit parallel to serial converter (XP2SC) 92. The XRB 91 ensures that data is always immediately available to the XP2SC 92 without any contention with PP accesses. The XRB 91 may be thought of as providing a look ahead or data prefetch for the XP2SC 92. Data left over from a previous reformatting cycle is loaded into XP2SC 92 from the scratch pad memory 83.

The remaining bits of a byte of data is transferred into XP2SC 92 from XRB 91. Simultaneously, the transmit bit counter in the bit and byte control counters 85 is reset to 0. Each time a bit is shifted out of the XP2SC 92, the transmit bit counter is incremented. When the transmit bit counter counts up to eight, it indicates that XP2SC 92 is empty and the above explained process repeats itself.

Data shifted out of XP2SC 92 is transferred to the transmit serial to parallel converter (XS2PC) 93 and horizontal and vertical parity is generated for them by HPG 94 and VPG 95 respectively. When seven data bits have been accumulated in the XS2PC 93 the contents of the HPG 94 is appended to the seven data bits to form an 8-bit byte which is transferred to the scratch pad memory 83 via the scratch pad bus 87. During channel 0 of the appropriate frame the data byte in the scratch pad memory 83 is written into the appropriate DCUOB 200, 201 and passed to the DCU and subsequently transmitted over the T1 carrier.

The inverse of this process takes place in the receiver reformatter. Data from the T1 carrier is stored in the DCU input buffer (DUCIB) from which it is transferred to the scratch pad memory 83 via bus 87. At the appropriate time this data is transferred to the receiver parallel to serial converter RP2SC 103. Horizontal parity checks and vertical parity checks are performed by the horizontally parity checker (HPC) 104 and the vertical parity checker (VPC) 105 before the data is transferred to the receiver serial to parallel converter RS2PC 102.

When eight data bits are accumulated in the RS2PC 102 they are transferred to the receive write buffer (RWB) 101 and then into the I/O buffer 60 via bus 62. The RWB 101 provides the same kind of asynchronous interface that the XRB 91 provides in the transmit section. The receive bit counter in the bit and byte control counter 85 keeps track of the number of data bits in the RS2PC 102. The above description covers the generation and reception of data bytes.

Idle pattern is generated by jamming the input of the XS2PC 93 to "1". The vertical parity byte is transmitted by selecting the vertical parity generator (VPG) 95 output as an input to the XS2PC 93.

The control byte is transmitted by disabling the XRB 91 outputs and loading the XP2SC with six bits of control data. The transmit bit counter is preset to a count of 2. When the six control bits have been shifted out the transmit bit counter will initiate the transfer of the first data byte into the XS2SC 93. The first data bit D0 will then be shifted out as part of the control byte.

A detailed description of one reformatting cycle of the RDLC will now be given. During this cycle 19 steps are performed each step lasting approximately 324 ns. During the first 324 ns, data is read out of the scratch pad memory 83 and stored in the receiver bit and byte counters 85, thereby loading the counters. The receiver bit and byte counters indicate how many bits of a valid data are contained in the receiver serial to parallel to converter (RS2PC) 102 and how many bytes of the complete packet have already been received and stored into the receive buffers of I/O buffer 60.

During the next 324 ns period, data is read out of the scratch pad memory 83 and written into RS2PC 102. This normally consists of part of one byte of received data. The rest of the byte will be filled in during the remainder of this reformatting cycle.

During the next 324 ns period data is read out of the scratch pad memory 83 and stored into the vertical parity checker (VPC) 105. This data consists of a partially completed check sum of the data in the received data message or packet.

During the next 324 ns period, data is read out of the scratch pad memory 83 and stored into the receiver parallel to serial converter (RP2SC) 103. This data is the data byte that was most recently been received on the data link.

During the next 324 ns period, data is read out of the scratch pad memory 83 and written into the transmit bit and byte counters 85. Again, these counters indicate how many bits of valid data remain in the transmit parallel to serial converter (XP2SC) 92 and how many bytes of the complete data message have already been transmitted. Coincident with this and the next three 324 ns periods the data which has just been loaded into the receiver circuitry will be shifted by seven or eight bit positions, as appropriate. At the end of this shifting process, the receive data byte will have been reformatted.

During the next 324 ns period, data is read out of the scratch pad memory 83 and written into the XP2SC 92. This data normally consists of one or more bits which need to be transmitted.

During the next 324 ns period, data is read out of the scratch pad memory 83 and written into the transmit vertical parity generator (VPG) 95. This data normally consists of a partially computed check sum for the data message which is being transmitted. Coincident with the preceding operation, the cue pointer byte for the link which is being processed is read out of the main memory 82 and the appropriate cue pointer bits are extracted and stored into a latch in preparation for an I/O buffer 60 access which will take place during the next 324 ns period.

During the next 324 ns period, no access occurs to the scratch pad memory 83. The I/O buffer 60 is accessed and the next data byte which must be transmitted is fetched and stored into the transmit receive buffer (XRB) 91. During the transmit reformatting operation one or more bits of data from this byte may be merged with the data bits in XP2SC 92 to form the actual data byte which will be transmitted.

During the next 324 ns period, the contents of the receiver bit and byte counters 85 is stored into the scratch pad memory 83 to be saved until the next occurrence of a reformatting cycle for the same data link. Coincident with this period and the three succeeding 324 ns periods the contents of the transmit circuitry are shifted by seven or eight bit positions as appropriate. At the end of this period of shifting, the transmit data will have been reformatted and a data byte will be ready for transmission.

During the next 324 ns period, the contents of the RS2PC 102 is stored into the scratch pad memory 83 and will be saved until the next reformatting cycle for the same data link.

During the next 324 ns period, the contents of VPC 105 is stored into the scratch pad memory 83 to be saved until the next reformatting cycle for this same data link.

During the next 324 ns period, an arbitrary number is written into the scratch pad memory 83 which during the next period will be overwritten with valid data.

During the next 324 ns period, the contents of the transmit bit and byte counters 85 is stored into the scratch pad memory 83 where it will be saved until the next reformatting cycle for the same data link.

During the next 324 ns period, the contents of the XP2SC 92 is stored into the scratch pad memory 83 where it will be saved until the next reformatting cycle for the same data link.

During the next 324 ns period, the contents of VPG 95 is written into the scratch pad memory 83 where it will stored until the next reformatting cycle for the same data link. Coincident with the preceding step the cue pointer byte for this data link will be read out of the main memory 82 and the appropriate cue pointer bits will be extracted and latched in preparation for an I/O buffer memory 60 access which will take place during the next 324 ns period.

During the next 324 ns period, the contents of XS2PC 93 is written into the scratch pad memory 83. It is this data byte which will be transferred to the appropriate DCUOB during the next transfer period. Coincident with the preceding 324 ns period the I/O buffer memory 60 is accessed and the data byte which was recovered during the previous receiver reformatting interval is transferred from RWB 101 and written into I/O buffer 60 at the appropriate receiver buffer location.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A remote data link controller for processing control data in a telecommunication switching system, said telecommunication switching system including a peripheral processor and a plurality of digital data links for sending data messages in the form of message bytes to a plurality of remote located telecommunication switching systems, said remote data link controller comprising:

peripheral processor output buffer means connected to said peripheral processor, said peripheral processor output buffer means including a plurality of transmit buffers, each transmit buffer associated with one of said plurality of digital data links, each transmit buffer arranged to store a plurality of control data in the form of data words from said peripheral processor;

formatting means connected to said peripheral processor output buffer means, said formatting means disposed to process sequentially one data word from each of said plurality of transmit buffers, assembling each data word into a message byte;

temporary memory means connected to said formatting means, said temporary memory means including a plurality of memory location areas, each memory location area associated with one of said plurality of digital data links, said temporary memory means arranged to receive and store in each memory location area a completed message byte and a partially completed message byte processed by said formatting means for each of said plurality of digital data links;

counter means connected to said temporary memory means, arranged to count the number of message bytes assembled for each of said plurality of digital data links and a count of the number of data bits contained in a partially completed message byte, said counter means outputting said count of message bytes and said count of the number of bits in a partially completed message byte to a respective one of said memory location areas associated with each of said plurality of digital data links;

a plurality of data link output buffers connected to said temporary memory, each of said plurality of data link output buffers connected to a plurality of digital data links, each data link output buffer arranged to receive from said temporary memory in sequential order a message byte to be transmitted over a respective digital data link.

2. The remote data link controller as claimed in claim 1, wherein: said counter means is sequentially loaded with the count of the number of message bytes assembled and the count of the number of data bits contained in a partially completed message byte from said temporary memory means and for each loading the associated partially completed message byte is loaded into said formatting means from said temporary memory means and a new data word from the associated transmit buffer is input into said formatting means assembling a new message byte, whereby said new message byte, a new partially completed message byte and a new count of the number of message bytes assembled, and a new count of the number of bits contained in a partially completed message byte are returned to the associated memory location area in said temporary memory.

3. The remote data link controller as claimed in claim 2, wherein: said remote data link controller further includes an address sequencer means connected to said temporary memory means, said address sequencer means arranged to develop addresses for accessing said memory location areas sequentially for each of said digital data links.

4. The remote data link controller as claimed in claim 2, wherein: said remote data link controller further includes a link processor complex and a main memory, said link processor complex is connected to said main memory, said temporary memory and said peripheral processor, whereby said data link processor controls the operation of said remote data link controller and communicates status information to said peripheral processor by loading said status information into said main memory.

5. A remote data link controller for processing control data in a telecommunication switching system, said telecommunication switching system including a peripheral processor and a plurality of digital data links for receiving data messages in the form of message bytes from a plurality of remote located telecommunication switching systems, said remote data link controller comprising:

a plurality of data link input buffers, each data link input buffer connected to a plurality of digital data links and each data link input buffer arranged to receive from each digital data link a message byte of a data message transmitted from an associated and respective remote located telecommunication switching system;

temporary memory means connected to said plurality of data link input buffers, said temporary memory means including a plurality of memory location areas, each memory location area associated with one of said plurality of digital data links, said temporary memory means arranged to receive and store in each memory location area a message byte from an associated data link input buffer;

reformatting means connected to said temporary memory means, said reformatting means arranged to process sequentially message bytes from each of said memory location areas assembling a data word for each of said plurality of digital data links;

counter means connected to said temporary memory means arranged to count sequentially for each digital data link the number of data words assembled by said reformatting means and a count of the number of data bits contained in a partially assembled data word remaining in said reformatting means after a complete data word has been assembled, said counter means outputting said count of the number of data word assembled and said count of the number of data bits contained in a partially assembled data word to a respective and an associated one of said memory location areas when said partially assembled data word is output to said temporary memory means;

peripheral processor input buffer means connected to said reformatting means, said peripheral processor input buffer means including a plurality of receive buffers, each receive buffer associated with one of said plurality of digital data links and each receive buffer arranged to receive and store a plurality of data words forming said control data from said formatting means, whereby said peripheral processor accesses each of said receive buffers reading said control data.

6. The remote data link controller as claimed in claim 5, wherein: said counter means is sequentially loaded with said count of the number of data words assembled and said count of the number of data bits contained in a partially assembled data word from said temporary memory means and during each loading the associated partially completed data word is loaded into said reformatting means from said temporary memory means and a new message byte from the associated data link input buffer is loaded to said reformatting means from said temporary memory means, whereby a new data word is assembled and said new data word is output to the associated receive buffer of said peripheral processor input buffer and a new partially completed data word, a new count of the number of data words assembled and a new count of the number of bits contained in a partially completed data word are returned to the associated memory location area in said temporary memory means.

7. The remote data link controller as claimed in claim 6, wherein: said remote data link controller further includes address sequencer means connected to said temporary memory means, said address sequencer means arranged to develop addresses for accessing said memory location areas sequentially for each of said digital data links.

8. The remote data link controller as claimed in claim 6, wherein: said remote data link controller further includes a link processor complex and a main memory, said link processor complex is connected to said main memory, temporary memory means and said peripheral processor whereby, said data link processor complex controls the operation of said remote data link controller and communicates status information to said peripheral processor by loading said status information into said main memory.

* * * * *